US010934197B2

(12) United States Patent
Perez et al.

(10) Patent No.: US 10,934,197 B2
(45) Date of Patent: Mar. 2, 2021

(54) ELECTRONIC WATER PRE-TREATMENT EQUIPMENT AND METHODS

(71) Applicant: Unlimited Water Solutions LLC, Copperas Cove, TX (US)

(72) Inventors: Roberto Ariel Salinas Perez, Beaumont, TX (US); Oscar Ricardo Garcia Navarro, Beaumont, TX (US); Jennifer Leahann Teeter, Copperas Cove, TX (US)

(73) Assignee: UNLIMITED WATER SOLUTIONS LLC, Copperas Cove, TX (US)

( * ) Notice: Subject to any disclaimer, the term of this patent is extended or adjusted under 35 U.S.C. 154(b) by 534 days.

(21) Appl. No.: 15/738,996

(22) PCT Filed: Nov. 4, 2016

(86) PCT No.: PCT/US2016/060697
§ 371 (c)(1),
(2) Date: Dec. 21, 2017

(87) PCT Pub. No.: WO2017/079672
PCT Pub. Date: May 11, 2017

(65) Prior Publication Data
US 2018/0186671 A1    Jul. 5, 2018

Related U.S. Application Data

(60) Provisional application No. 62/252,312, filed on Nov. 6, 2015, provisional application No. 62/252,253, filed on Nov. 6, 2015.

(51) Int. Cl.
*C02F 1/32* (2006.01)
*C02F 9/00* (2006.01)
(Continued)

(52) U.S. Cl.
CPC ............... *C02F 9/00* (2013.01); *C02F 1/008* (2013.01); *C02F 9/005* (2013.01); *C02F 1/002* (2013.01);
(Continued)

(58) Field of Classification Search
CPC .. C02F 9/00; C02F 9/005; C02F 1/008; C02F 1/78; C02F 2201/4616; C02F 1/463;
(Continued)

(56) References Cited

U.S. PATENT DOCUMENTS 6,180,014 B1    1/2001    Salama
6,346,197 B1    2/2002    Stephenson et al.
(Continued)

FOREIGN PATENT DOCUMENTS

JP    2000015260 A    1/2000
WO    2015176137 A1   11/2015

OTHER PUBLICATIONS

Derwent-Ace-No. 2003-469165, "Dewent week: 200345," Mar. 25, 2003, 1 page.

*Primary Examiner* — Cameron J Allen
(74) *Attorney, Agent, or Firm* — Slater Matsil, LLP

(57) ABSTRACT

A water treatment equipment includes a reaction chamber, a waveform generator, and a controller. The reaction chamber includes a pipe having a first electrode and a second electrode. The first and second electrodes are coupled to a waveform generator. The reaction chamber includes a water inlet, and a water outlet. The waveform generator is coupled to the first and second electrodes. The waveform generator is configured to generate an electrical current with a frequency that is substantially equal to the electrical resonance of the pipe of the reaction chamber. The controller is configured to control the waveform generator, wherein the
(Continued)

reaction chamber is configured to enable a flow of ozone and water to be treated through the pipe.

21 Claims, 6 Drawing Sheets

(51) Int. Cl.
| | | |
|---|---|---|
| *C02F 1/00* | (2006.01) | |
| *C02F 101/20* | (2006.01) | |
| *C02F 101/10* | (2006.01) | |
| *C02F 1/465* | (2006.01) | |
| *C02F 101/30* | (2006.01) | |
| *C02F 1/44* | (2006.01) | |
| *C02F 1/463* | (2006.01) | |
| *C02F 1/467* | (2006.01) | |
| *C02F 1/469* | (2006.01) | |
| *C02F 1/66* | (2006.01) | |
| *C02F 1/78* | (2006.01) | |
| *C02F 103/10* | (2006.01) | |

(52) U.S. Cl.
CPC .......... *C02F 1/32* (2013.01); *C02F 1/44* (2013.01); *C02F 1/441* (2013.01); *C02F 1/442* (2013.01); *C02F 1/463* (2013.01); *C02F 1/465* (2013.01); *C02F 1/4672* (2013.01); *C02F 1/4674* (2013.01); *C02F 1/4693* (2013.01); *C02F 1/66* (2013.01); *C02F 1/78* (2013.01); *C02F 2101/10* (2013.01); *C02F 2101/101* (2013.01); *C02F 2101/20* (2013.01); *C02F 2101/30* (2013.01); *C02F 2103/10* (2013.01); *C02F 2201/4614* (2013.01); *C02F 2201/4616* (2013.01); *C02F 2201/782* (2013.01); *C02F 2209/001* (2013.01); *C02F 2209/03* (2013.01); *C02F 2209/05* (2013.01); *C02F 2209/06* (2013.01); *C02F 2209/11* (2013.01); *C02F 2301/046* (2013.01)

(58) Field of Classification Search
CPC ............ C02F 2209/001; C02F 2209/11; C02F 1/4693; C02F 2301/046; C02F 2209/05; C02F 2209/06; C02F 1/4674; C02F 2103/10; C02F 1/002; C02F 2201/782; C02F 1/441; C02F 1/4672; C02F 1/66; C02F 1/32; C02F 2101/101; C02F 1/44; C02F 2101/10; C02F 2209/03; C02F 1/465; C02F 2101/20; C02F 1/442; C02F 2101/30; C02F 2201/4614
See application file for complete search history.

(56) References Cited

U.S. PATENT DOCUMENTS

| | | | |
|---|---|---|---|
| 9,296,629 B2 | 3/2016 | Van Vliet et al. | |
| 2003/0140940 A1* | 7/2003 | Meldrum | A23B 7/16 134/1 |
| 2003/0173300 A1 | 9/2003 | Bradley | |
| 2004/0099599 A1* | 5/2004 | Van Vliet | C02F 11/06 210/603 |
| 2004/0251213 A1 | 12/2004 | Bradley | |
| 2006/0027463 A1* | 2/2006 | Lavelle | C02F 1/4674 205/556 |
| 2007/0017874 A1* | 1/2007 | Renaud | C02F 1/20 210/703 |
| 2007/0158276 A1 | 7/2007 | Markle | |
| 2008/0053822 A1* | 3/2008 | Miyahara | C02F 1/463 204/272 |
| 2009/0107915 A1 | 4/2009 | Skinner et al. | |
| 2009/0314659 A1* | 12/2009 | Field | A47L 11/4041 205/770 |
| 2011/0011801 A1 | 1/2011 | Cho | |
| 2011/0233070 A1 | 9/2011 | Martinez et al. | |
| 2013/0075332 A1* | 3/2013 | Prakash | B01D 61/002 210/639 |
| 2013/0118994 A1 | 5/2013 | Altman | |
| 2013/0161262 A1 | 6/2013 | Henley | |
| 2013/0341267 A1 | 12/2013 | Prasad et al. | |
| 2014/0374236 A1 | 12/2014 | Moore et al. | |
| 2015/0166383 A1 | 6/2015 | Visnja et al. | |
| 2017/0107137 A1 | 4/2017 | Jung et al. | |
| 2017/0217809 A1 | 8/2017 | Laurence et al. | |
| 2018/0179097 A1 | 6/2018 | Navarro et al. | |
| 2018/0186671 A1 | 7/2018 | Perez et al. | |
| 2018/0230026 A1 | 8/2018 | Raynel et al. | |

* cited by examiner

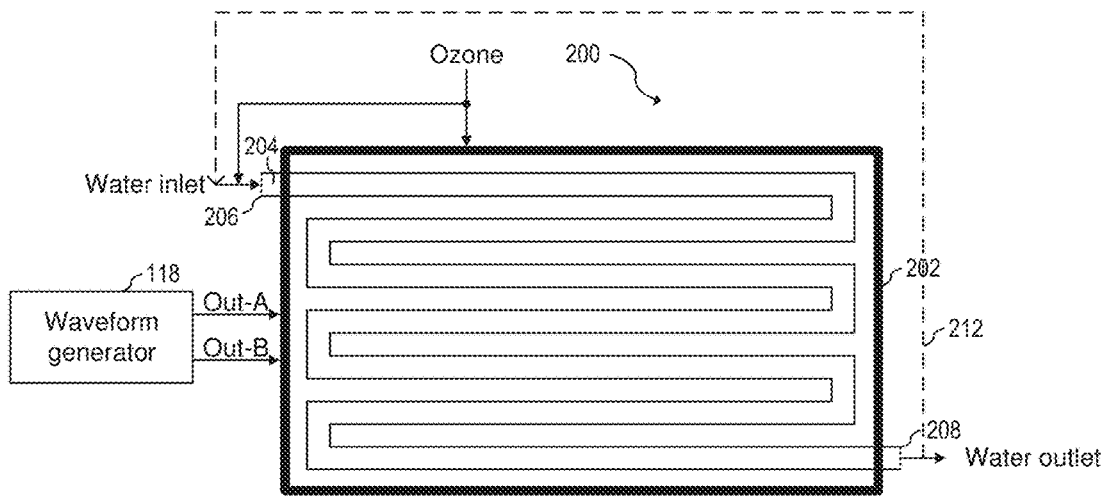
FIG. 2
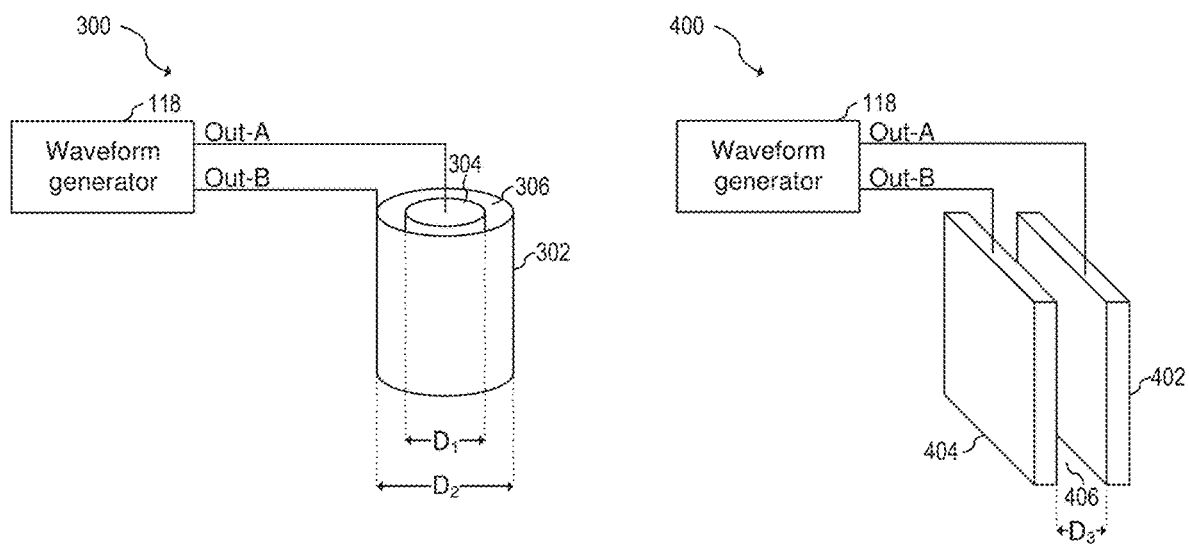
FIG. 3          FIG. 4

ELECTRONIC WATER PRE-TREATMENT EQUIPMENT AND METHODS

CROSS-REFERENCE TO RELATED APPLICATIONS

This application is a national phase filing under section 371 of PCT/US2016/060697, filed on Nov. 4, 2016, which claims the benefit of U.S. Provisional Application No. 62/252,312, filed on Nov. 6, 2015 and U.S. Provisional Application No. 62/252,253, filed on Nov. 6, 2015, which applications are hereby incorporated herein by reference.

This application is related to International Patent Application filed on Nov. 4, 2016 and entitled "System and Methods for Water Treatment", which application is hereby incorporated herein by reference.

TECHNICAL FIELD

The present invention relates generally to a system and method of water treatment and, in particular embodiments, to equipment and methods for electronic water pre-treatment.

BACKGROUND

Water is a crucial resource that, at times, may be considered a scarce resource. In many areas, especially the Southwest of the United States, local communities have to make hard choices of either supplying water for domestic consumption or supplying water to industries such as agriculture. The decision may not be easy, as communities balance their need to grow their local economies while managing scarce resources.

Reclaiming waste water and rendering the water suitable for re-use and/or disposal may ameliorate the problem of scarce water. There are many ways to clean water, but most communities rely on a few methods that combine coagulation, particle settling, filtration, and disinfection.

While traditional wastewater treatments methods may be effective to clean common types of wastewaters, such methods may be ineffective when treating waters resulting from certain industrial processes. For example, industrial processes such as hydraulic fracturing may add toxic contaminants and toxic chemicals to wastewaters. Not properly treating contaminated wastewater may be costly to the environment.

SUMMARY

In accordance with an embodiment, a method of treating water includes introducing a mixture including ozone and water to be treated into a pipe of a reaction chamber. The pipe includes a first electrode and a second electrode. The water is cleaned by producing an electrical current through the mixture between the first electrode and the second electrode.

Implementations may include one or more of the following features. The electrical current may have a waveform with a square-wave shape, a sawtooth shape, a shape formed with pulse width modulation, or a shape formed with pulse amplitude modulation. The electrical current may have a waveform with a frequency that creates an electrical resonance frequency of the pipe or the reaction chamber. The frequency of the waveform is between 30 hz and 500 khz.

In accordance with an alternative embodiment, a water treatment equipment includes a reaction chamber that includes a pipe, a water inlet, and a water outlet. The pipe includes a first electrode and a second electrode. A waveform generator is coupled to the first and second electrodes. A controller controls the waveform generator. The reaction chamber enables a flow of ozone and water to be treated through the pipe.

Implementations may include one or more of the following features. The ozone and the water to be treated may be received into the reaction chamber and pipe through the water inlet. The water treatment equipment may further include a measuring device coupled to the reaction chamber and to the controller. The measuring device may be configured to monitor water quality inside the reaction chamber. The pipe may have an inner cylinder and an outer cylinder, where the inner cylinder includes the first electrode and the outer cylinder includes the second electrode. The water to be treated may be configured to flow between the inner cylinder and the outer cylinder. The inner cylinder may be made of a first metal and the outer cylinder may be made of a second metal. The first metal and the second metal may be the same metal. The first metal may include iron, aluminum, titanium, stainless steel, duplex, zinc, brass, copper, carbon and the second metal may include aluminum. The reaction chamber may include an ozone inlet in to the pipe. The water treatment equipment may further include an oxidizer coupled to the ozone inlet, where the oxidizer is configured to generate the ozone. The water treatment equipment may further include a neutralizer coupled to the water outlet of the reaction chamber. The water treatment equipment may further include a measuring device that monitors water quality of water produced by the water treatment equipment.

In accordance with an alternative embodiment, a water treatment equipment includes a first reaction chamber that includes a water inlet to receive water to be treated, a pipe that includes a first electrode and a second electrode. The first and second electrodes are configured to be coupled to a first waveform generator. The first reaction chamber is configured to receive ozone, and generate an electrical current between the first electrode and the second electrode in response to a flow of water and ozone through the pipe.

Implementations may include one or more of the following features. The water treatment equipment further includes an oxidizer to generate the ozone, where the first reaction chamber is configured to receive the ozone from the oxidizer. The water treatment equipment may further include a second reaction chamber coupled to the first reaction chamber. The first reaction chamber and the second reaction chamber may be coupled in series, where a water output of the first reaction is fed into a water inlet of the second reaction chamber. Alternatively, the first reaction chamber and the second reaction chamber may be coupled in parallel, where a first portion of the untreated water is treated in the first reaction chamber and a second portion of the untreated water is treated in the second reaction chamber.

BRIEF DESCRIPTION OF THE DRAWINGS

For a more complete understanding of the present invention, and the advantages thereof, reference is now made to the following descriptions taken in conjunction with the accompanying drawings, in which:

FIG. 2 illustrates a reaction chamber according to an embodiment of the present invention;

FIGS. 3-5 illustrate magnified views of various embodiments for the water intake mechanism through the reaction chamber;

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, an electronic water pre-treatment equipment and methods that enhance oxidation using custom electrical waveforms in various configurations and in specific examples of wastewaters to be treated and treated water quality to be obtained. Embodiments of the present invention may also be used in alternative configurations as well as in treating other types of liquids and solutions as well as for targeting treated water quality.

Wastewater from industries may contain significant amounts of toxic material. These toxic materials may be present in the wastewater as total suspended solids (TSS), dissolved, or suspended organic compounds and biological material, all of which may need to be removed from the water in order to categorize the water as safe.

Embodiments of the present invention efficiently remove various types of contaminants in an energy and space efficient way by using a combination of a chemical oxidizer and an electronic process. For example, the reactions in the electrolysis process help to activate and accelerate the effect of the chemical oxidizer, which helps to activate and accelerate the electrochemical reaction at the electrodes of the electrolytic cell. In various embodiments, highly reactive oxidizing radicals and highly reactive reducing radicals are rapidly formed within the water being treated. These highly reactive radicals oxidize and reduce different types of contaminants to form reactant products, which can then be subsequently removed easily using filtration techniques such as mechanical filtration.

Figure 1:
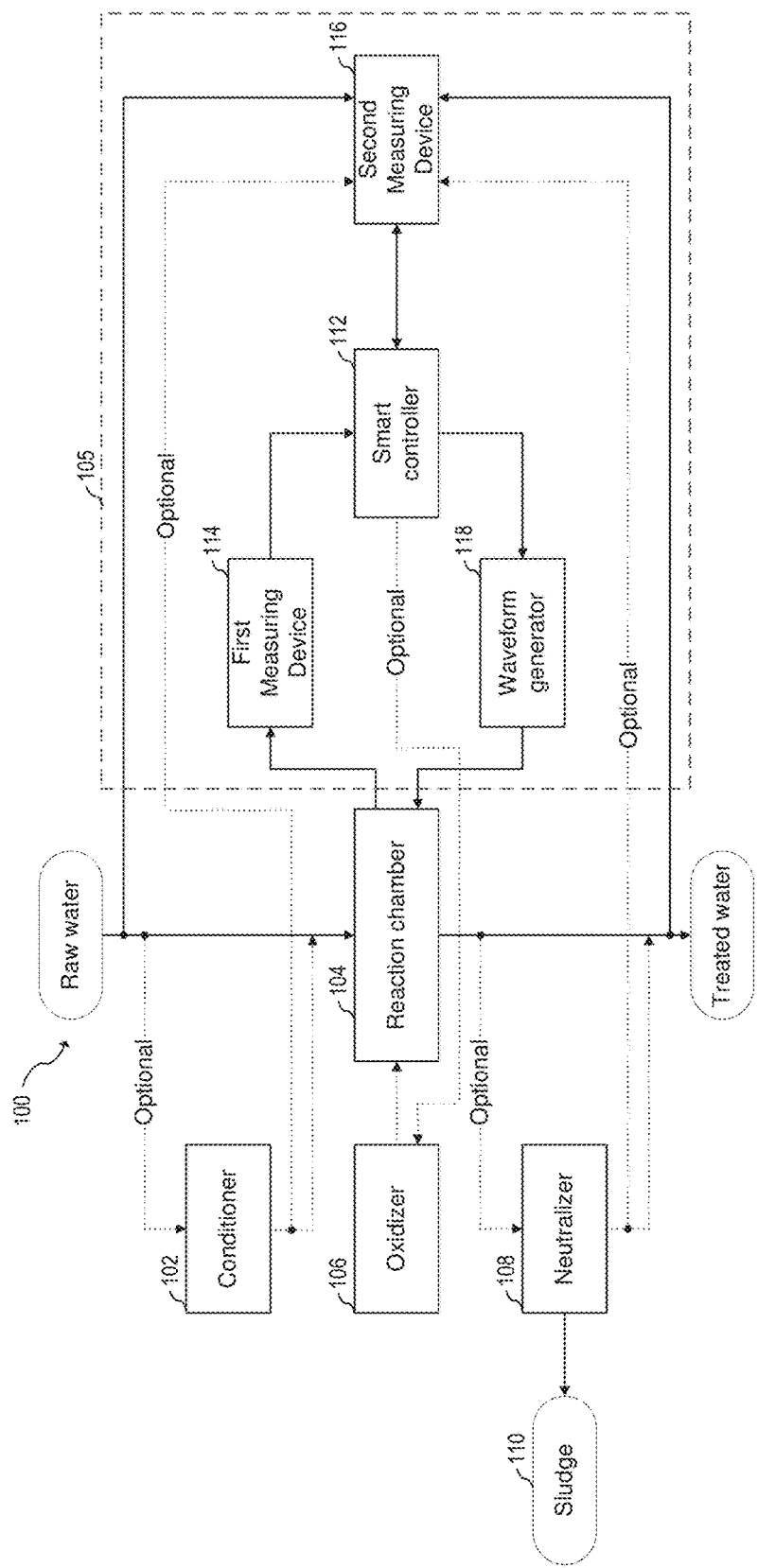
FIG. 1 illustrates electronic oxidation system for water treatment according to an embodiment of the present invention.

FIG. 1 illustrates an electronic oxidation system 100 for water treatment according to an embodiment of the present invention. The electronic oxidation system 100 receives raw water, i.e., untreated or contaminated water, and generates treated water, also known as filtered water, after subjecting the raw water to ozone and electrical discharges. Electronic oxidation system 100 includes reaction chamber stage 104 and control system 105. Electronic oxidation system 100 may include optional conditioner 102, optional neutralizer 108, and optional oxidizer 106. Control system 105 includes first measuring device 114 and a second measuring device 116, waveform generator 118, and a smart controller 112.

During normal operation, reaction chamber stage 104 may be configured to remove specific elements from the water it receives. Specifically, reaction chamber stage 104 utilizes many processes such as electrocoagulation operated in synchronization with ozone to generate particles that attach to specific elements or particles to be removed from the incoming water. The reaction chamber stage 104 also utilizes processes such as electro-flotation, electro-chlorination, electrolysis, and electro-oxidation. Configurable electrical waveforms may be used to optimize the process. Once the chemical reaction occurs, the newly formed particles may float or precipitate. Such newly formed particles may be removed in a subsequent filtering stage (not shown) that may use, for example, semi permeable membranes configured to remove particles bigger than 1 µm or bigger than a predefined value.

Flocculants generated by reaction chamber stage 104 may be charged with free radicals that create hyper oxidation, which may be beneficial in the treatment of heavy metals and organic materials. For example, reaction chamber stage 104 may be effective in removing heavy metals, polymers, sulfates, carbonates and salts.

Depending on the process parameters such as the transit time for the water, oxidizing and reducing conditions, and the number of charged flocculants generated, the water output from the reaction chamber stage 104 may still comprise charged flocculants and radicals. Such charged flocculants and radicals may continue to react even after the water exits reaction chamber stage 104. If such effect is desired, such as in the case where another filtering stage (not shown) follows electronic oxidation system 100, neutralizer 108 may be bypassed.

In some embodiments, water may be left inside reaction chamber stage 104 to allow for the free radicals to finish reacting. For example, an outlet valve may be manually. Alternatively, the outlet valve may be automatically controlled by the control system 105 while monitoring results from the first measurement device 114.

Alternatively, water may be deposited in a container, i.e., a neutralizer 108 during a neutralization stage to allow the free radicals to finish reacting prior to water exiting electronic oxidation system 100. Prior to water exiting neutralizer 108, a filtering stage (not shown) may remove particles from the system, generating sludge 110. In some embodiments, the filtering stage may be integrated with the neutralizer 108, as shown.

The first measuring device 114 may be configured to monitor particular parameters of interest, such as the pressure in the reaction chamber stage 104, the amount of ozone introduced to the reaction chamber stage 104, the effect of the electronic oxidation system, and may measure the sedimentation rate of the flocculated particles at the output of the reaction chamber stage 104 and other parameters of interest. Other parameters such as the turbidity, conductivity, and pH of the liquid may be monitored as well. Similarly, second measuring device 116 may be configured to monitor the quality of the raw water and the quality of the treated water.

Additionally, the second measuring device 116 may be configured to monitor the quality of water after each stage of electronic oxidation system 100, such as after optional conditioner 102 and optional neutralizer 108.

The flow of ozone and the type and intensity of the electrical waveform applied to the water while the water is in reaction chamber stage 104 are among the parameters that may be dynamically controlled. Controlling such parameters may allow for optimizing the generation of free radicals and accelerating reaction times and the reduction or elimination of some specific contaminants.

Smart controller 112 may use information from the first and second measuring devices 114 and 116 to configure the type of waveform and the intensity of waveform generated by waveform generator 118. The smart controller 112 may also control the inlet and outlet valves to the reaction chamber stage 104 for the various gases including ozone and liquids including water to be treated. For example, the flow of ozone generated by optional oxidizer 106 may also be controlled by smart controller 112.

Waveform generator 118 may be configured to generate a variety of waveforms, such as PAM, PWM, and sawtooth waveforms as well as chirps. Other waveforms types may also be generated. Specifically, waveforms with varying pulse width, pulse frequency, and pulse voltage/current including varying of these parameters is possible. For example, as an illustration, in response to the results from the first measuring device 114 and/or the second measuring device 116, the pulse voltage or pulse width may be increased. Waveform generator 118 may be implemented in any way known in the art.

Optional conditioner 102 may be used to modify the pH of the raw water. Reaction chamber stage 104 may be able to directly treat water with a pH as low as 5 or as high as 8, i.e., in the pH range 5-8. When reaction chamber stage 104 receives water with a pH level between 5 and 8, electronic oxidation system 100 may generate water with a pH closer to neutral. For example, when advanced reaction chamber stage 104 receives water with a pH of 5, advanced reaction chamber stage 104 may produce water with a pH of 7. When the pH of the raw water is outside that range, conditioner 102 may be used to alter the pH of the raw water to bring it into the range. Traditional ways to lower the pH, such as by adding hydrochloric acid (HCl) or increase pH by adding washing soda or soda ash may be used. When the pH of the raw water is within an acceptable range, such as between 5 and 8, optional conditioner 102 may be bypassed.

Optional oxidizer 106 may be used to generate ozone in situ and provide the generated ozone to reaction chamber stage 104. Ozone may be generated by a discharge electrical corona in air, electrolysis, or any other way known in the art.

Electronic oxidation system 100 may operate without using synthetic polymers or organic polymers and it may not introduce micro-organism to aid in the treatment of the water. In that regard, electronic oxidation system 100 may be considered a chemical-free and no-microbe process.

FIG. 2 illustrates a reaction chamber 200 in accordance to an embodiment of the present invention. Reaction chamber stage 104 in FIG. 1 may be implemented as the reaction chamber 200.

As illustrated in FIG. 2, the reaction chamber 200 may be configured to generate free radicals that react with organic materials and other inorganic contaminants. The particles in the water being treated inside the reaction chamber 200 may be electrically modified to promote agglomeration, which may result in formation of insoluble precipitates that may be removed at a later filtering stage. Reaction chamber 200 includes optional chamber enclosure 202, pipe 204, water inlet 206, and water outlet 208. The waveform generator 118 (e.g., described in FIG. 1) may be coupled to pipe 204.

As illustrated in FIG. 2, wastewater or water to be treated may be introduced into the pipe 204 through the water inlet 206. Treated water may be produced at the water outlet 208. Ozone may be introduced in the pipe 204 either by introducing the ozone into the wastewater prior to its introduction into the pipe 204. For example, a mixing chamber prior to the introduction into the reaction chamber 200 may be used to mix the injected ozone into the water to be treated such that some amount of ozone is dissolved into the water. Alternatively, direct ozone injection at other locations on the pipe 204 may also be used.

The reaction chamber 200 has parts for facilitating an oxidation process (ozone process) and electronic processes such as electro-coagulation, electro-flotation, electro-chlorination, electrolysis and electro-oxidation, which may all be activated simultaneously using the electrical waveform.

The ozone process, also known as ozonation, utilizes ozone ($O_3$), a triatomic form of Oxygen. Ozone is water soluble but quickly decomposes releasing molecular diatomic oxygen and a highly reactive oxygen radical, which reacts with water molecules to form several free radicals, including species such as hydroxyl OH, $HO_3$, $HO_4$ besides $O_2$. For example, the released oxygen radical may react with water to generate hydroxyl radicals, which may react further and may be accelerated when in contact with other organic compounds and other compounds. Such free radicals are highly reactive and are readily available to react instantly with any organic compounds present in fluid. Ozone can enhance the treating power of the metal ions as well, making them as oxidants more potent than $O_3$. The unwanted inorganic contaminants comprising iron, manganese, nitrite, sulfate, hydrogen sulfide, heavy metals, are also oxidized and react with the metal ions.

Accordingly, the free radicals introduced by the addition of ozone may react with organic/inorganic contaminants present in wastewaters to form products that may be easily removed via traditional filtration techniques, such as activated charcoal. In various embodiments, the destruction of organic material may be achieved by direct oxidation or by indirect oxidation. Direct oxidation involves ozone directly reacting with organic compounds. Indirect oxidation involves free radicals such as hydroxyl ions formed from the ozone that react with organic materials. The use of the electronic process may accelerate the indirect oxidation process significantly.

The electronic process involves the in situ generation of coagulants by electrolytic oxidation of a sacrificial electrode upon the application of an electrical discharge. The electronic process is an electrolytic process that is enhanced by the addition of the ozone in various embodiments. When the sacrificial electrode is the anode (connected to positive potential), the metal is oxidized to form metal ions that are released into the electrolyte, which in this case is the water being treated.

The electrolytic cell may be powered with a direct current (DC) or an alternating current (AC). The use of alternating current may be advantageous to consume electrode material from both electrodes. In other words, the anode and the cathode are exchanged during an AC. However, a DC may be used when only one electrode is to be the sacrificial electrode, for example, the inner electrode may be easily replaced at low cost and may be used as the sacrificial electrode.

The material of the sacrificial anode varies with the contamination in the water. For example, heavy metal removal may be achieved by the coagulation/flocculation using metal ions such as $Fe_2^+$, $Fe_3^+$, and $Al_3^+$ ions released into the treated solution by electrochemical corrosion of sacrificial electrodes. The electrode may be of a material and may include iron, aluminum, and other metals such as titanium, carbon, zinc, brass, copper, stainless steel, duplex, or other alloys. By customizing the material of the electrodes, waste water with a wide range of chemistries may be treated.

Accordingly, in one illustration, the anode reaction may comprise the oxidation of iron to ferrous ion ($Fe^{2+}$) ($Fe \rightarrow Fe^{2+} + 2e$) while a cathode reaction at the other electrode may comprise the generation of hydroxyl ions from ozone ($O_3 + H_2O + 2e \rightarrow O_2 + 2OH^-$). These may not be the only reactions involved at the cathode and anode but are shown only as illustration of the synergistic effect.

As suggested above, combining ozonation with the electronic process may produce synergistic effects. For example, ozone may enhance the treating power of the metal ions such as $Al_3^+$ and $Fe_2^+$. Ozone may also further cause $Fe^{2+}$ to oxidize quickly to $Fe_3^+$, OH, ferrate ($FeO_4^{2-}$), and ferryl ($FeO)^{2+}$. Such ferryl/ferrate ions such as $Fe^{4+}$ or $Fe^{6+}$ are highly unstable that may quickly return to a stable state, such as ferric and ferrous ions ($Fe^{2+}/Fe^{3+}$) by reacting with (oxidizing) impurities being removed. The fast reduction of ferryl/ferrate ions ($Fe^{4+}/Fe^{6+}$) accelerates the oxidation process to between 3 to 5 orders of magnitude faster than either ozonation or electronic systems working alone. The accelerated oxidation process accelerates the reduction of total suspended solids (TSS), coloration, chemical oxygen demand (COD), biological oxygen demand (BOD), sulfides ($S^{2-}$), and/or total dissolved solids (TDS).

Unwanted inorganic compounds comprising iron, manganese, nitrite, sulfate, hydrogen sulfide, and heavy metals may oxidize and may react with the metal ions such as $Al^{3+}$ and $Fe^{2+}$. Flocculants formed by such reactions may be easily separated by traditional filtration processes due to their higher stability, lower content of the bound water, and larger surface compared to chemical flocculants.

The time the waste water is subjected to ozonation and electrocoagulation, also known as contact time, may be related to the length of pipe 204, shape of the pipe 204, the flow pressure, and the cross-sectional flow area. The shape of pipe 204 may be serpentine-looking, which may optimize the size of reaction chamber 200 while achieving high contact times. A serpentine-looking pipe has the additional benefit of creating drastic changes in the direction of the water flow. Drastic changes in direction of pipe 204 may create turbulence in the water, which may create a mixing effect that further facilitates reactions among the reagents. Other shapes may be used in alternative embodiments.

Advantages of embodiments of the present invention include increasing contact times by having electrodes extend along the length of the pipe. Reagents, therefore, are generated along the pipe, which may result in continuous reactions while the water is flowing through the pipe. Since reagents are generated in situ, the system may be effective without the addition of flocculating agents. Avoiding addition of external chemicals may also reduce the volume of sludge generated.

As previously described, the reaction chamber 200 is coupled to measuring devices for monitoring process parameters such as water quality, ozone content within the reaction chamber 200 as well as the water quality exiting the reaction chamber 200.

A waveform generator 118 may also be coupled to pipe 204 to facilitate the electronic process in various embodiments. Specifically, the waveform generator 118 may be coupled to electrodes in pipe 204.

The electrical resonance of the reaction chamber 200, specifically the electrical resonance of the pipe 204, may be used and created in conjunction with the specially designed waveform generation in order to optimize the electronic process. The electrical resonance of the pipe 204 may be affected by the selection of the materials used, as well as by the shape of the pipe, and the distance between electrodes. The electrical resonance may also be affected by the composition of the liquid running through the pipe, the temperature of the liquid, the shape of the pipe, the length of the pipe, the material of the pipe, including the material of each electrode, the mechanical interface between the pipe and the rest of the reaction chamber, the material of the reaction chamber, and other parameters. The electrical resonance may range from 30 Hz to 500 kHz and may be 100 Hz as an illustration.

The electrical resonance may be used as a way to maximize the transfer of energy from waveform generator 118 while reducing the power consumption of the system. In other words, when the waveform generator generates a waveform at a frequency that is near or at the electrical resonance of the pipe, less energy may be used to achieve an effective electronic process. Advantageously, the water is heated to lesser extent due to energy wastage by the use of waveforms that match the electrical resonance of the pipe 204. In alternative embodiments, the electrical resonance of the reaction chamber 200 may be identified and used to set the frequency of the waveforms.

In addition to the above, in various embodiments, the water from the outlet may be optionally recirculated 212. In various embodiments, the recirculation may be performed irrespective of the connections such as when multiple chambers are connected in series, parallel, or when only a single reaction chamber is used.

Advantageously, in various embodiments, because of the space efficiency and energy efficiency achievable, embodiments of the present invention may be very compact and may be used for home sewage treatment, recreational vehicle sewage treatment, water treatment in trains, ships, planes, and other forms of treatment requiring low energy and space.

Figure 5:
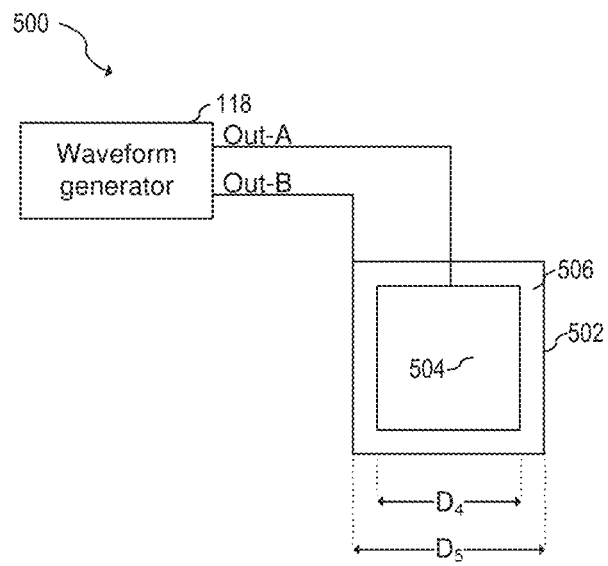

FIGS. 3-5 illustrate various designs for the pipes according to embodiments of the present invention. The shape of the pipe 204 as well as the distance between electrodes may impact the effectiveness of the electronic process.

FIG. 3 illustrates a pipe 300 according to an embodiment of the present invention. Pipe 300 includes inner electrode 304 and outer electrode 302. Electrodes 302 and 304 also serve as a guide for water to flow. A waveform generator 118 may be coupled to each electrode. Water being treated may flow through opening 306 and exit through the other end of the pipe 300. In various embodiments, electrodes 302 and 304 may be made of aluminum, iron, or others metals, and other alloys. Electrodes 302 may be made of aluminum and electrode 304 may be made of iron in one embodiment. Alternatively, both electrodes 302 and 304 may be of the same material.

In the case of pipe 300, a typical diameter for inner electrode 304 may be $D_1$, which may be 1.5 inches, for example. A typical diameter for outer electrode 302 may be $D_2$, which may be 2 inches, for example. Other values may be used.

FIG. 4 illustrates a pipe 400 according to an embodiment of the present invention. The pipe 400 includes first and second electrodes 402 and 404 separated by a distance $D_3$.

The electrodes 402 and 404 may also serve as a guide for water to flow through opening 406. For example, in such embodiments, an insulating material may be used at the remaining two sidewalls of the pipe 400 facilitating water flow through the pipe 400.

FIG. 5 illustrates a pipe 500 according to an embodiment of the present invention. Pipe 500 includes an inner electrode 504 and an outer electrode 502. The inner and outer electrodes 502 and 504 also serve as a guide for water to flow. The waveform generator 118 may be coupled to each electrode and water being treated may flow through opening 506. A typical diameter for inner electrode 504 may be $D_4$, which may be 1.5 inches. A typical diameter for outer electrode 502 may be $D_5$, which may be 2 inches. Other values may be used.

Figure 6:
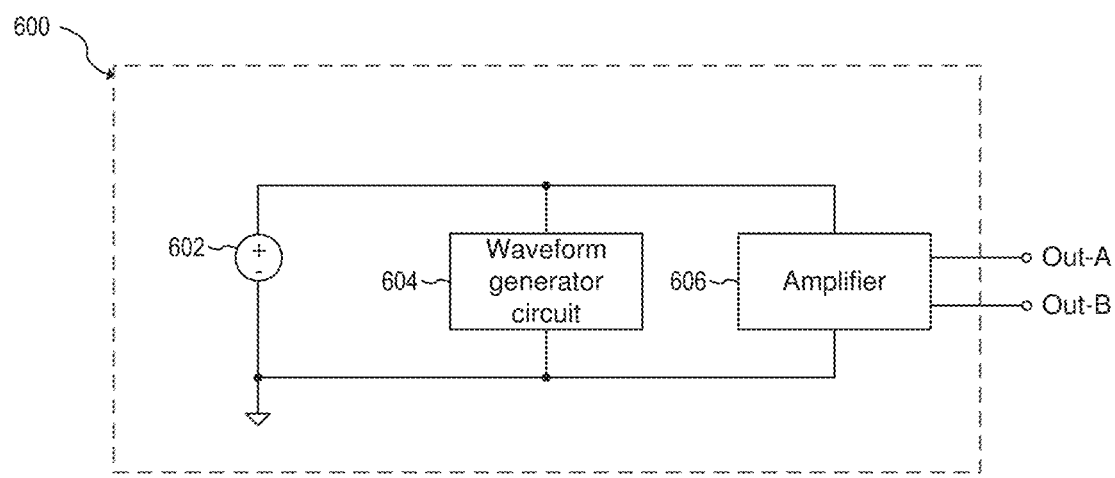
FIG. 6 illustrates a waveform generator according to an embodiment of the present invention.

Waveform generator 118 may be implemented in any way known in the art. For example, FIG. 6 illustrates a waveform generator 600 according to an embodiment of the present invention.

The waveform generator 600 includes power supply 602, a waveform generator circuit 604, and an amplifier 606. The waveform generator circuit 604 may be configured to generate signals such as square-waves, sinusoidal waves, sawtooth waves, and custom waveforms. Waveforms may be generated of various frequencies and amplitude. The frequency and amplitude of the waveforms may also change dynamically.

The amplifier 606 may be used to deliver the signal to electrodes through terminals Out-A and Out-B. The amplifier 606 has a differential output in one embodiment. Alternatively, amplifier 606 may have a single-ended output, using ground as the second terminal. Other implementations known in the art may be used.

The shape and intensity of the waveforms used in the electrical discharge during the electronic process may impact the formation of stable flocculants. For example, modulating the amplitude and frequency of the waveform or changing the shape of the waveform may cause activation of the molecular structure of the flocculant, which may create larger structures that may be easier to remove in subsequent filtration stages.

FIGS. 7A-7B, 8-9 illustrate different waveforms that may be used to power the reaction chamber in accordance with various embodiments of the present invention.

In various embodiments, the waveforms may be specially designed with amplitude, width, and frequency sweep and modulation. In various embodiments, the waveforms may be unipolar, bipolar, and/or mounted in a DC offset.

Figure 7A:
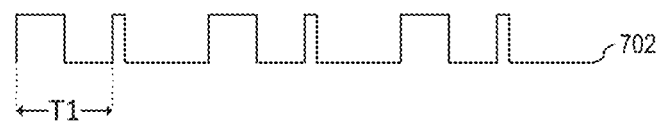
FIGS. 7A-7B, 8-9 illustrate waveforms according to an embodiment of the present invention.
Figure 7B:
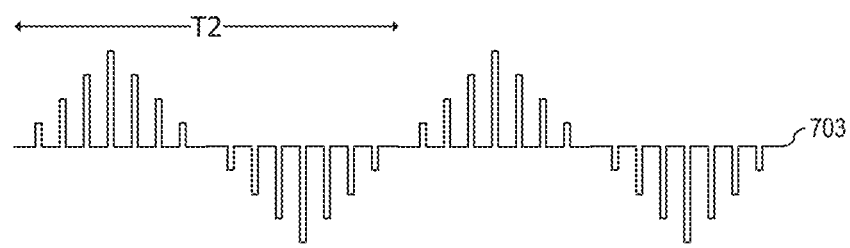

In one illustration, FIG. 7A shows PWM signal 702 having a period $T_1$ and a frequency $f_1=1/T_1$. Frequency f1 may be selected such that it is near or at a electrical resonance of the pipe. For example, 100 Hz may be selected. Other values may be used. The waveform such as the PWM signal 702 may operate continuously. Alternatively, the PWM signal 702 may pulse from time to time. In contrast, FIG. 7B illustrates a pulse amplitude modulated signal 703.

Figure 8:
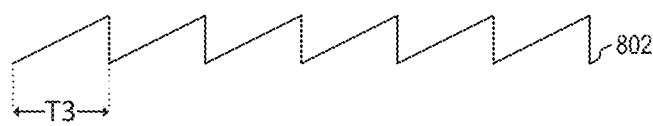
Figure 9:
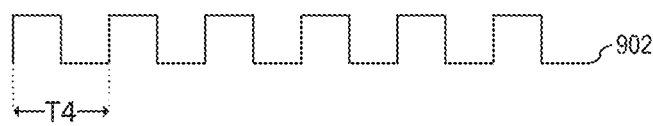

In another illustration, FIG. 8 shows sawtooth signal 802 having a period $T_2$ and a frequency $f_2=1/T_2$. Alternatively, FIG. 9 shows square wave signal 902 having a period $T_3$ and a frequency $f_3=1/T_3$. Other waveform shapes may also be used. Waveform shapes may also include a combination of known shapes or may be entirely customized.

Advantages of embodiments of the present invention include achieving high levels of energy efficiency. In particular, by generating waveforms that operate at or near the electrical resonance of the system, less energy may be used in order to achieve the desired electro-coagulations. Such efficiency may be as high as 5 times more efficient than traditional methods.

Figure 10:
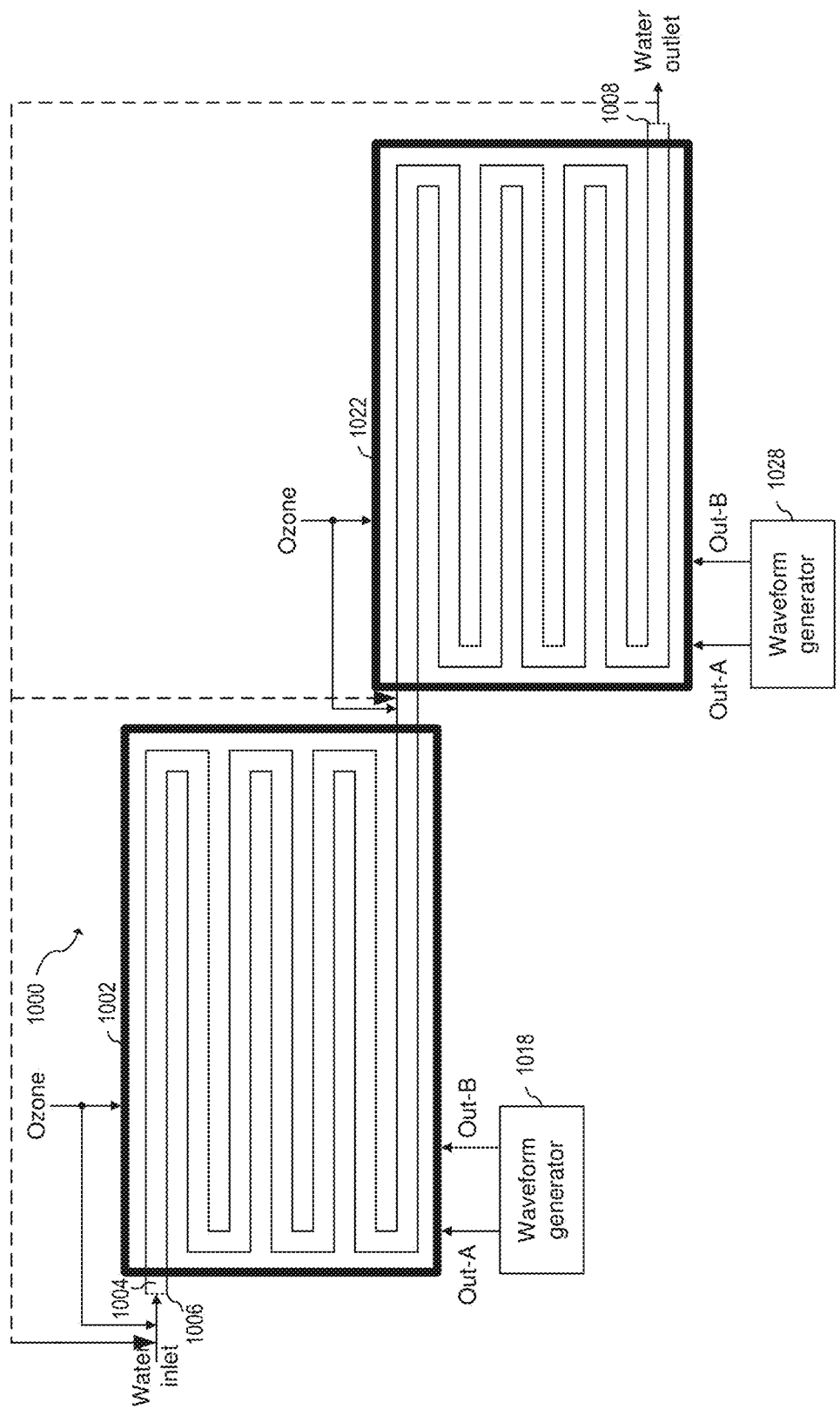
FIG. 10 illustrates an electronic oxidation system comprising a plurality of reaction chambers placed in series.

FIG. 10 illustrates an electronic oxidation system comprising a plurality of reaction chambers placed in series. Such a configuration may increase the contact time, thereby augmenting the amount of reactions and, therefore, the amount of toxic components removed from the water.

Referring to FIG. 10, a first series reaction chamber 1000 receives the water to be treated at a first series water inlet 1004 and produces an output that feeds into a second series reaction chamber 1022. Each of these reactions chambers may be coupled to the same waveform generators or different waveform generator. For example, the first series waveform generator 1018 may generate a different waveform from the second series waveform generator 1028.

In one embodiment, each reaction chamber may be tailored to remove one particular class of contamination. Thus, the design of each reaction chamber may be customized to be optimum for that class of contamination. The water after being treated by the reaction system exits at the series outlet valve 1008. As previously described, in one or more embodiments, some or all of the water exiting the reaction chamber may be recirculated for retreatment. The recirculation may be done for some or all of the reaction chambers in the sequence in various embodiments.

Figure 11:
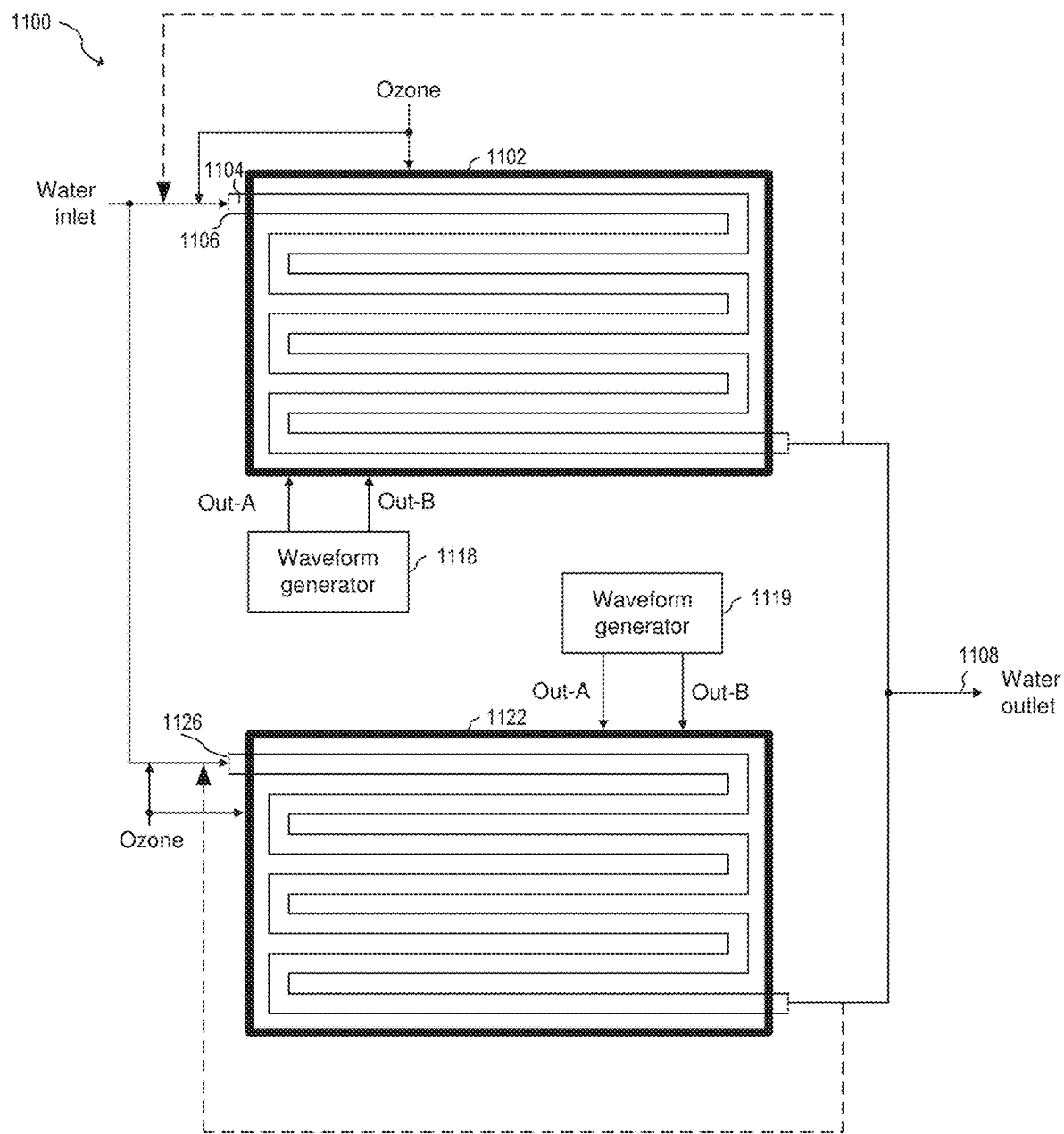
FIG. 11 illustrates an electronic oxidation system comprising multiple reaction chambers coupled in parallel such that the water flow from the electronic oxidation system is increased.

FIG. 11 illustrates an electronic oxidation system comprising multiple reaction chambers coupled in parallel such that the water flow from the electronic oxidation system is increased. As illustrated in FIG. 11, a portion of the water being treated is fed into the first parallel reaction chamber 1102 through the first parallel input valve 1104 and a second portion of the water being treated is fed into the second parallel reaction chamber 1122 through the second parallel input valve 1126. As previously described, in one or more embodiments, some or all of the water exiting the reaction chamber may be recirculated for retreatment. The recirculation may be done for some or all of the reaction chambers in the sequence in various embodiments.

As described above with respect to FIG. 10, a first parallel waveform generator 1118 may generate a different waveform from a second parallel waveform generator 1128 in some embodiments.

The first parallel reaction chamber 1102 and the second parallel reaction chamber 1122 may have separate inlets for ozone. Alternatively, the ozone may be premixed with the waste water before injecting the water to be treated into the reaction chambers. The water produced by the individual reaction chambers is combined at the parallel water outlet 1108.

Combinations of series and parallel connections may be used to achieve a desired contact time and water flow. For example, a system may be built having five modules in parallel, with each module having three reaction chambers in series. Another system may include four of such modules in parallel.

Connecting various reaction chambers in series or parallel may also affect the electrical resonance of the system. In such a case, the waveforms may need to be adjusted accordingly.

Additionally, pipes may also be connected in series or parallel configuration inside a single reaction chamber, thereby modifying the contact time and water flow coming from a single chamber.

Advantages of embodiments of the present invention include that the system is scalable and customizable. In other words, by selecting a connection configuration of various reaction chambers, a desired contact time and water flow may be achieved. Additionally, each chamber in such a system may be further customized to remove particular elements. For example, a first reaction chamber may have Iron electrodes and a second reaction chamber may have Aluminum electrodes, thereby targeting removal of different components.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. For illustration, embodiments described above in FIGS. 1-11 may be combined with each other. It is therefore intended that the appended claims encompass any such modifications or embodiments.

What is claimed is:

1. A method of treating water, the method comprising:
introducing a mixture comprising ozone and water to be treated into a pipe of a reaction chamber, the pipe comprising a first electrode and a second electrode; and
cleaning the water by producing an electrical current through the mixture between the first electrode and the second electrode, wherein the electrical current has a waveform with a frequency that is substantially equal to the electrical resonance of the pipe of the reaction chamber.

2. The method of claim 1, further comprising:
dissolving a sacrificial anode to generate metal ions; and
removing heavy metal by coagulation/flocculation using the metal ions.

3. The method of claim 2, wherein the pipe comprises the sacrificial anode and a cathode and wherein the sacrificial anode comprises aluminum or iron.

4. The method of claim 1, wherein the electrical current has a waveform with a square-wave shape, a sawtooth shape, a shape formed with pulse width modulation, or a shape formed with pulse amplitude modulation.

5. The method of claim 1, wherein the frequency of the waveform is between 30 Hz and 500 kHz.

6. A water treatment equipment comprising:
a reaction chamber comprising
a pipe comprising a first electrode and a second electrode, the first and second electrodes configured to be coupled to a waveform generator,
a water inlet, and
a water outlet;
a waveform generator coupled to the first and second electrodes, wherein the waveform generator is configured to generate an electrical current with a frequency that is substantially equal to the electrical resonance of the pipe of the reaction chamber; and
a controller configured to control the waveform generator, wherein the reaction chamber is configured to enable a flow of ozone and water to be treated through the pipe.

7. The water treatment equipment of claim 6, where the ozone and the water to be treated are received through the water inlet.

8. The water treatment equipment of claim 6, further comprising a measuring device coupled to the reaction chamber and to the controller, the measuring device configured to monitor water quality inside the reaction chamber.

9. The water treatment equipment of claim 6, wherein the pipe has an inner cylinder and an outer cylinder, the inner cylinder comprising the first electrode and the outer cylinder comprising the second electrode, wherein the water to be treated is configured to flow between the inner cylinder and the outer cylinder.

10. The water treatment equipment of claim 9, wherein the inner cylinder is made of a first metal and the outer cylinder is made of a second metal, wherein the first metal comprises iron, aluminum, titanium, stainless steel, duplex, zinc, brass, copper, carbon and the second metal comprises aluminum.

11. The water treatment equipment of claim 10, wherein the first metal and the second metal are the same metal.

12. The water treatment equipment of claim 6, wherein the reaction chamber comprises an ozone inlet into the pipe, wherein the water treatment equipment further comprises an oxidizer coupled to the ozone inlet, the oxidizer configured to generate the ozone.

13. The water treatment equipment of claim 6, further comprising a neutralizer coupled to the water outlet of the reaction chamber.

14. The water treatment equipment of claim 6, further comprising a measuring device that monitors water quality of water produced by the water treatment equipment.

15. A water treatment equipment comprising:
a first reaction chamber comprising
a first water inlet to receive water to be treated; and
a first pipe comprising a first electrode and a second electrode, the first and second electrodes configured to be coupled to a first waveform generator, wherein the first reaction chamber is configured to receive ozone, and generate a first electrical current between the first electrode and the second electrode in response to a flow of water and ozone through the first pipe, wherein the electrical current has a first waveform with a first frequency that is substantially equal to the electrical resonance of the first pipe of the first reaction chamber; and
a second reaction chamber separate from the first reaction chamber, the second reaction chamber comprising
a second water inlet to receive water to be treated; and
a second pipe comprising a third electrode and a fourth electrode, the third and fourth electrodes configured to be coupled to a second waveform generator, wherein the second reaction chamber is configured to receive ozone, and generate a second electrical current between the third electrode and the fourth electrode in response to a flow of water and ozone through the second pipe, wherein the second electrical current has a second waveform with a second frequency that is substantially equal to the electrical resonance of the second pipe of the second reaction chamber.

16. The water treatment equipment of claim 15, further comprising an oxidizer to generate the ozone, wherein the first reaction chamber is configured to receive the ozone from the oxidizer.

17. The water treatment equipment of claim 15, wherein the first reaction chamber and the second reaction chamber are coupled in series, wherein a water output of the first reaction is fed into a water inlet of the second reaction chamber.

18. The water treatment equipment of claim 15, wherein the first reaction chamber and the second reaction chamber are coupled in parallel, wherein a first portion of the water to be treated is treated in the first reaction chamber and a second portion of the water to be treated is treated in the second reaction chamber.

19. The water treatment equipment of claim 15, wherein the first waveform is a different waveform from the second waveform.

20. The water treatment equipment of claim 15, wherein the pipe comprises a first sidewall comprising the first electrode and an opposite second sidewall comprising the second electrode, and a third sidewall and an opposite fourth sidewall between the first sidewall and the second sidewall, the third and fourth sidewalls comprising an insulating material.

21. The water treatment equipment of claim 15, wherein the pipe is serpentine shaped configured to cause drastic changes in the direction of the flow of the water being treated through the pipe.

* * * * *